US012710348B2

(12) United States Patent
Evju et al.

(10) Patent No.: US 12,710,348 B2
(45) Date of Patent: Aug. 18, 2026

(54) SYSTEMS AND METHODS FOR BLOCKAGE DETECTION IN GAS DETECTORS

(71) Applicant: Carrier Corporation, Palm Beach Gardens, FL (US)

(72) Inventors: Jon K. Evju, Shakopee, MN (US); Tanner Warner, Chanhassen, MN (US)

(73) Assignee: DETECTOR ELECTRONICS BUYER US, LLC, Stamford, CT (US)

( * ) Notice: Subject to any disclaimer, the term of this patent is extended or adjusted under 35 U.S.C. 154(b) by 680 days.

(21) Appl. No.: 18/167,037

(22) Filed: Feb. 9, 2023

(65) Prior Publication Data

US 2023/0280255 A1 Sep. 7, 2023

Related U.S. Application Data

(60) Provisional application No. 63/268,966, filed on Mar. 7, 2022.

(51) Int. Cl.
*G01N 15/02* (2024.01)
*G01N 21/3518* (2014.01)
(Continued)

(52) U.S. Cl.
CPC ..... *G01N 15/0272* (2013.01); *G01N 21/3518* (2013.01); *G01N 2015/138* (2024.01);
(Continued)

(58) Field of Classification Search
None
See application file for complete search history.

(56) References Cited

U.S. PATENT DOCUMENTS 5,828,458 A 10/1998 Taylor et al.
7,012,685 B1 3/2006 Wilson
(Continued)

FOREIGN PATENT DOCUMENTS

CN 111044685 A 4/2020
CN 113944986 A * 1/2022 ................ F24F 8/80
(Continued)

OTHER PUBLICATIONS

European Search Report for Application No. 23160283.0, Issued Jun. 16, 2023, 17 Pages.

*Primary Examiner* — Daniel S Larkin
(74) *Attorney, Agent, or Firm* — CANTOR COLBURN LLP

(57) ABSTRACT

Methods and systems for detecting barrier blockage in a gas detector are disclosed. In some embodiments, a gas detector comprises a barrier configured to define a sensing chamber of the gas detector. The gas detector further comprises a radiation detection system. The radiation detection system comprises a radiation source and a detector. The radiation detection system may be configured for generating output signals related to radiation transmitted through the barrier. The gas detector comprises a controller operatively connected to the radiation detection system. The controller is configured to: determine an amount of radiation transmitted through the barrier based on the output signals; and determine a condition of the barrier based on the determined amount of radiation, wherein the determined condition indicates whether the barrier is blocked.

12 Claims, 8 Drawing Sheets

100

(51) Int. Cl.
*G01N 15/12* (2006.01)
*G01N 21/17* (2006.01)

(52) U.S. Cl.
CPC ................ *G01N 2021/1744* (2013.01); *G01N 2201/022* (2013.01)

(56) References Cited

U.S. PATENT DOCUMENTS

| | | | |
|---|---|---|---|
| 7,034,943 | B1 | 4/2006 | Moeckli et al. |
| 7,132,659 | B2 | 11/2006 | Starta et al. |
| 7,835,004 | B2 | 11/2010 | Uber et al. |
| 7,886,576 | B2 | 2/2011 | Uber |
| 8,409,864 | B2 | 4/2013 | Ash |
| 8,744,780 | B2 | 6/2014 | Wilson et al. |
| 10,495,620 | B2 | 12/2019 | Johansen et al. |
| 10,639,577 | B1 | 5/2020 | Wilson, Jr. et al. |
| 10,788,458 | B2 | 9/2020 | Miller et al. |
| 10,967,321 | B2 | 4/2021 | Prabhakar |
| 2020/0363306 | A1 | 11/2020 | Sexton et al. |

FOREIGN PATENT DOCUMENTS

| | | | | | |
|---|---|---|---|---|---|
| EP | 2330577 | A1 | | 6/2011 | |
| EP | 3113133 | A2 | | 1/2017 | |
| EP | 3798607 | A1 | | 3/2021 | |
| JP | S5214399 | A | | 2/1977 | |
| JP | 56119433 | A | | 9/1981 | |
| JP | H02181297 | A | | 7/1990 | |
| JP | 0484039 | A | | 3/1992 | |
| JP | H04250345 | A | | 9/1992 | |
| JP | 2014066446 | A | | 4/2014 | |
| JP | 2016070505 | A | | 5/2016 | |
| KR | 20060033255 | A | | 4/2006 | |
| KR | 101982566 | B | * | 5/2019 | ........... B01D 46/422 |
| WO | 2019153665 | A1 | | 8/2019 | |
| WO | 2020120663 | A1 | | 6/2020 | |

* cited by examiner

100

SYSTEMS AND METHODS FOR BLOCKAGE DETECTION IN GAS DETECTORS

CROSS REFERENCE TO A RELATED APPLICATION

The application claims the benefit of U.S. Provisional Application No. 63/268,966 filed Mar. 7, 2022, the contents of which are hereby incorporated in their entirety.

BACKGROUND

The invention relates generally to blockage detection and, more specifically, to blockage detection in gas detectors.

Gas detectors generally use barriers and weather shields to protect sensors from the environment (e.g., liquids, dirt, debris, etc.). Some weather shields may include a barrier that allows gas to flow through while still blocking water. Other gas detectors may include a separate sensing interface that allows gas to flow through to the gas sensor (e.g., for providing flame-path characteristics to meet explosion proof requirements). However, the barrier may become blocked or clogged with dust and debris, which may impede gas detection on gas detectors.

BRIEF DESCRIPTION

Aspects of the disclosure relate to methods, apparatuses, and/or systems for blockage detection.

In some embodiments, a gas detector is provided. In some embodiments, the gas detector comprises a barrier configured to define a sensing chamber of the gas detector. The gas detector further comprises a radiation detection system. The radiation detection system comprises a radiation source and one or more radiation detectors. The radiation detection system may be configured for generating output signals related to radiation transmitted through the barrier. The gas detector comprises a controller operatively connected to the radiation detection system. The controller is configured to: determine an amount of radiation transmitted through the barrier based on the output signals; and determine a condition of the barrier based on the determined amount of radiation, wherein the determined condition indicates whether the barrier is blocked.

In some embodiments, presence of blockage in the barrier may be determined responsive to the determined amount of radiation being below a radiation threshold.

In some embodiments, the radiation threshold may be determined based on the radiation permeability of the barrier.

In some embodiments, the controller is further configured to determine an amount of blockage of the barrier based on the determined amount of radiation.

In some embodiments, the controller is further configured to determine a remaining operational life of the barrier based on the determined amount of radiation.

In some embodiments, the controller is configured to send an alert to a user, the alert indicating the condition of the barrier.

In some embodiments, the one or more detectors may comprise a first detector and a second detector. The first detector is located outside the sensing chamber, and the second detector and the radiation source are located inside the sensing chamber. The controller may be configured to determine a first amount of radiation transmitted through the barrier and received by the first detector; determine a second amount of radiation received by the second detector without going through the barrier; and determine the condition of the barrier based on a comparison of the first amount of radiation and the second amount of radiation.

In some embodiments, the radiation source is a light source and the detector is a light detector.

In some embodiments, a method for detecting barrier blockage in a gas detector is disclosed. In some embodiments, the gas detector comprises a barrier defining a sensing chamber of the gas detector, and a radiation detection system. The method comprises generating output signals related to radiation transmitted through the barrier; determining an amount of radiation transmitted through the barrier based on the output signals; determining a condition of the barrier based on the determined amount of radiation, wherein the determined condition indicates whether the barrier is blocked.

In some embodiments, a gas detector is provided. In some embodiments, the gas detector comprises a barrier blockage sensing interface; a radiation detection system, the radiation detection system comprising a radiation source and one or more radiation detectors, the radiation detection system configured for generating output signals related to radiation transmitted through the sensing interface; and a controller operatively connected to the radiation detection system. The controller may be configured to: determine an amount of radiation transmitted through the sensing interface based on the output signals; and determine a condition of the sensing interface based on the determined amount of radiation, wherein the determined condition indicates whether the sensing interface is blocked.

In some embodiments, the gas detector may comprise an enclosure, the enclosure configured to house a gas sensor and the radiation detection system; and a reflector located outside the enclosure, the reflector configured to reflect radiation, received from the radiation source through the sensing interface, back to the one or more radiation detectors, wherein the controller is configured to determine the amount of radiation transmitted through the sensing interface based on the radiation reflected back to the one or more detectors.

In some embodiments, the one or more detectors comprise a first detector and a second detector, wherein the first detector, the second detector, and the radiation source are located inside the enclosure; and the controller is configured to determine a first amount of radiation transmitted through the sensing interface and reflected back to the first radiation detector; determine a second amount of radiation received by the second detector without going through the sensing interface; and determine the condition of the sensing interface based on a comparison of the first amount of radiation and the second amount of radiation.

In some embodiments, the reflector is a light scattering surface.

In some embodiments, a gas detector may comprise a barrier blockage sensing interface comprising a window; a radiation detection system, the radiation detection system comprising a radiation source and one or more radiation detectors, the radiation detection system configured for generating output signals related to radiation transmitted through the window of the sensing interface; an enclosure, the enclosure configured to house a gas sensor and the radiation detection system; a reflector located outside the enclosure, the reflector configured to reflect radiation received from the radiation source through the window, back to the one or more radiation detectors through the window; and a controller operatively connected to the radiation detection system, the controller configured to determine an amount of radiation transmitted through the window of the sensing interface based on the output signals; and determine a condition of the sensing interface based on the determined amount of radiation, wherein the determined condition indicates whether the sensing interface is blocked.

In some embodiments, the one or more detectors comprise a first detector and a second detector, wherein the first detector, the second detector, and the radiation source are located inside the enclosure; and the controller is configured to determine a first amount of radiation transmitted through the window of the sensing interface and reflected back to the first radiation detector through the window; determine a second amount of radiation received by the second detector without going through the window; and determine the condition of the sensing interface based on a comparison of the first amount of radiation and the second amount of radiation.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

Figure 1A:
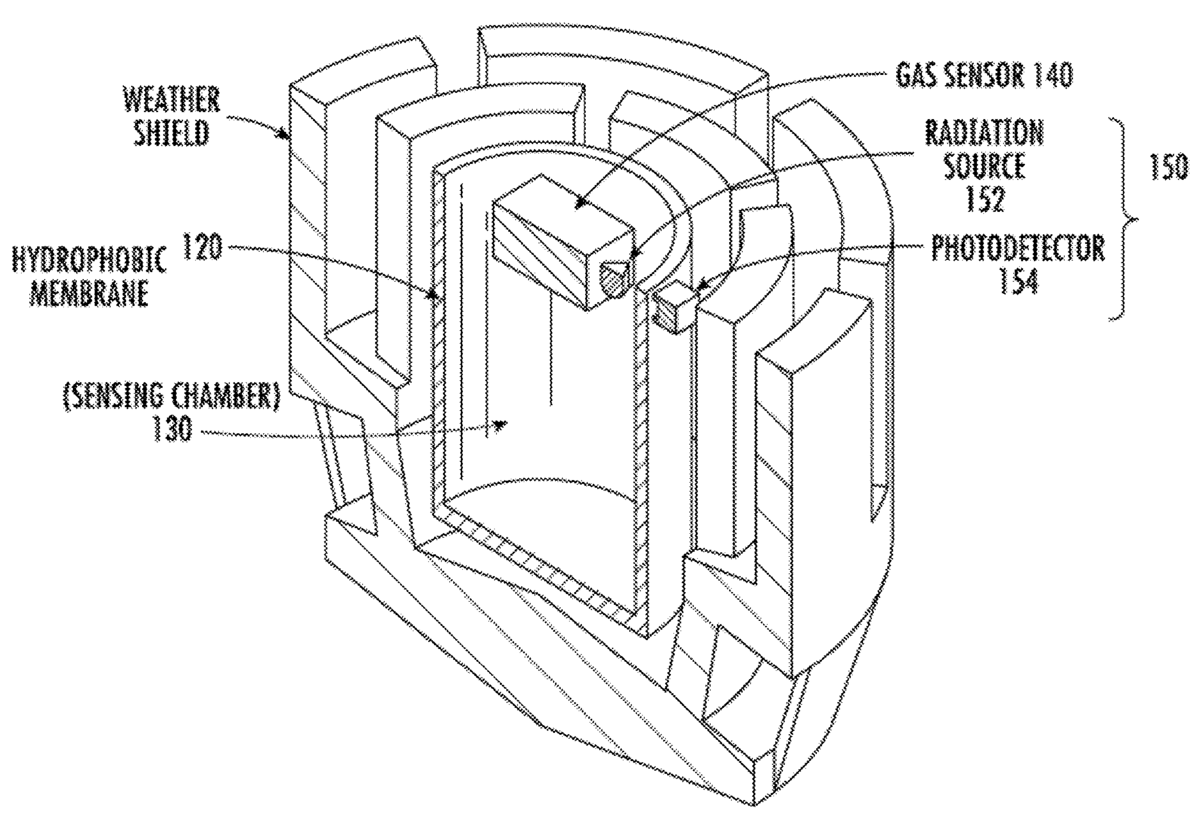
FIGS. 1A-C show perspective views of an example of a gas detector, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure, in accordance with some embodiments, describes methods and systems for detecting blockage in gas detectors. In some embodiments, gas sensors may include a weather shield meant to protect the sensor interface of the gas sensor from the environment (e.g., water, dust, debris, etc.) that may affect the sensor performance. In some cases, weather shields may include a barrier that defines a sensing chamber where the gas sensing interface is located. The barrier may be configured to allow gas to flow through, but blocks other elements (e.g., liquids, dust, dirt, etc.) from reaching the gas sensor. The barrier may get dirty or clogged which may prevent the gas from flowing into the sensing chamber and from reaching the gas sensor. In other gas detectors (e.g., combustible gas detectors), it may be required to have an intrinsically safe or explosion proof product. The explosion proof product may include a sensing interface that allows gas to flow through to the sensor and provides appropriate flame-path characteristics to meet explosion proof requirements. In these cases, the sensing interface may get dirty or clogged which may prevent the gas from reaching the gas sensor.

The present disclosure, in some embodiments, describes methods and systems for detecting one or more of blockage, compromised, and/or missing barrier. For example, in some embodiments, barrier blockage may be detected by measuring the amount of radiation transmitted through the barrier. For example, a decrease in radiation transmitted through the barrier may be indicative of blockage. Similarly, a comparison of radiation measurement inside the sensing chamber (defined by the barrier) and outside the sensing chamber may be indicative of blockage (e.g., radiation inside the sensing chamber does not go through the barrier before being measured). In the case of combustible gas detectors, blockage of the sensing interface may be detected by measuring the amount of radiation transmitted through the sensing interface. In some embodiments, a radiation detection system may be used to measure radiation through the barrier or the sensing interface. The radiation detection system may include a radiation source and one or more radiation detectors.

The present disclosure describes, herein below, an example of a light sensor that may be used in accordance with one or more embodiments. In events where the detected radiation increases (or above a radiation value), it may be indicative of physical damage compromising the barrier's integrity, or even a missing barrier. However, these scenarios are for illustrative purposes only and are not intended to be limiting. Other types of radiation detection systems capable of generating and detecting radiation may be used and are consistent with the present disclosure. The methods and systems in the present disclosure may be beneficial because of the use of radiation measurements to detect blockage. This may allow users to remotely monitor gas detectors to detect if the barrier is clean, or if it is becoming blocked, needing to be cleaned or changed out. With this advance warning, the end-user may schedule maintenance to clean or replace the barrier prior to failure and reduce costly downtime or gas detector failures due to blocked barriers. It is to be noted that, for simplicity of description, the following description refers to membrane. The term membrane as used herein refers to any type of barrier used in gas detectors which allows gas to flow to the sensing chamber and preventing other elements from reaching the gas sensor. For example, membrane as referred to herein may be one or more of porous sintered metal, a flexible membrane, a hydrophobic membrane, filter or any other type of barrier that allows the transfer of the gas(es) of interest.

Figure 1B:
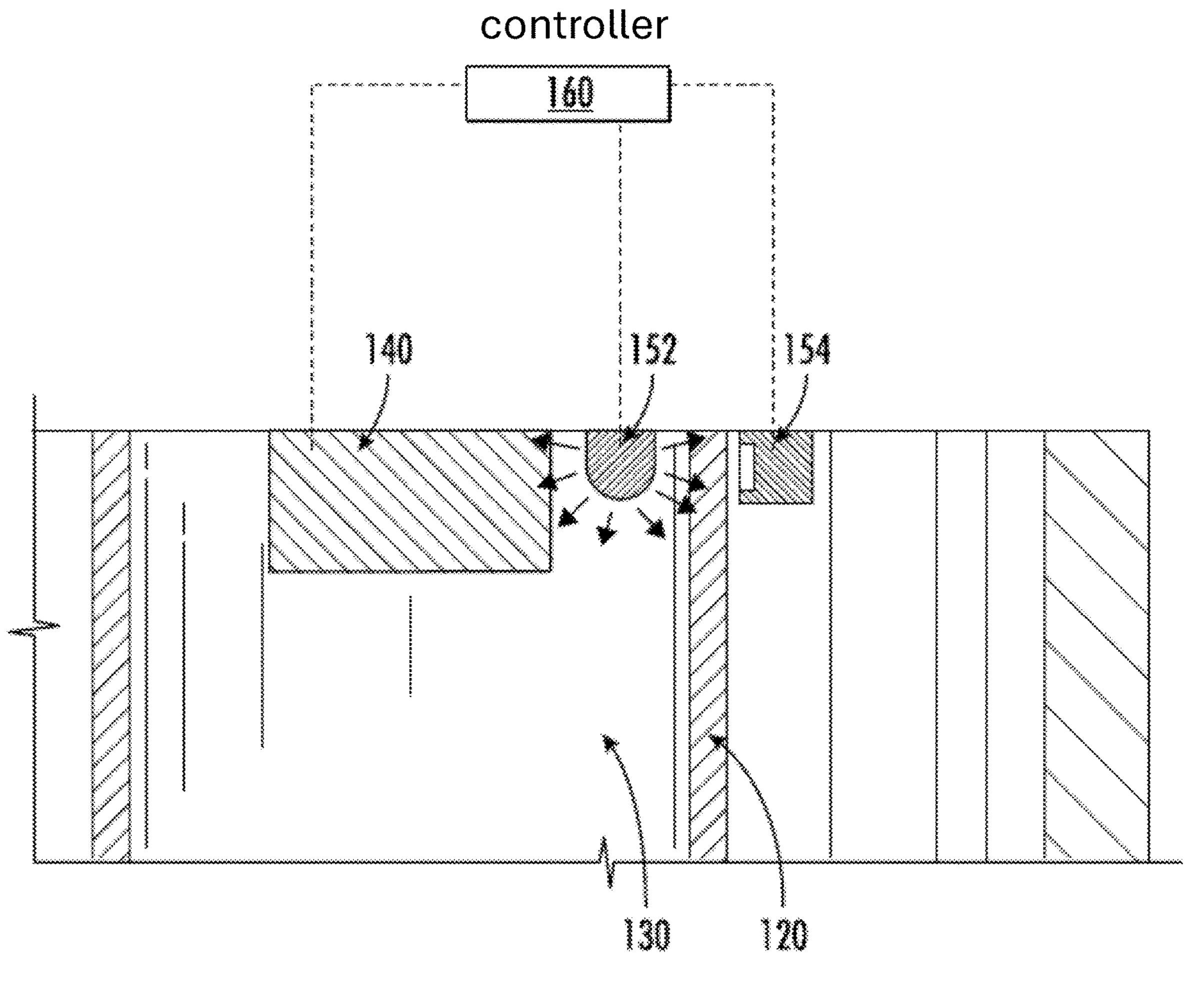
Figure 1C:
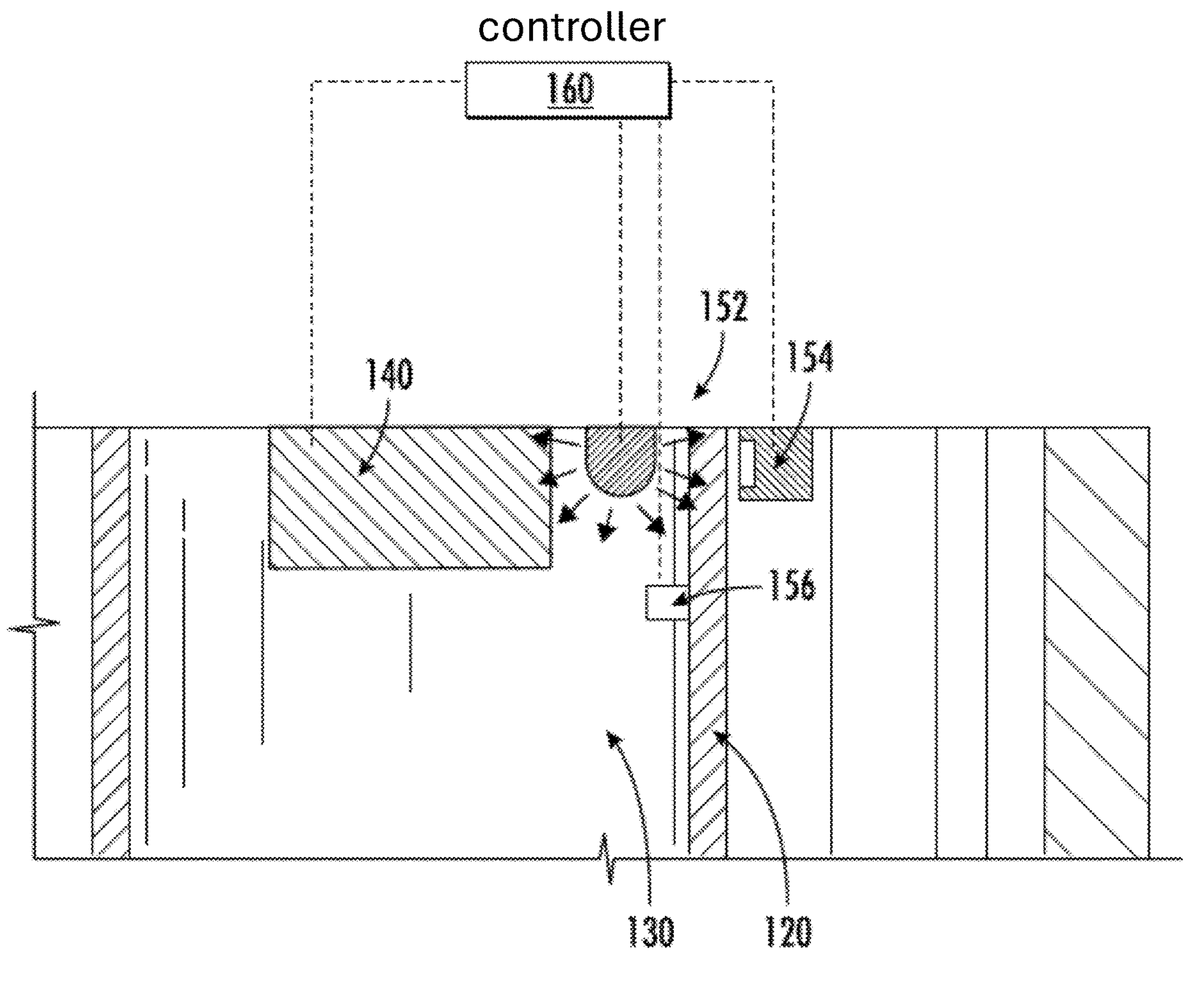

FIGS. 1A-C are perspective views of an example of a gas detector 100, in accordance with one or more embodiments. In some embodiments, gas detector 100 may include a membrane 120, a gas sensor 140, and a radiation detection system 150. In some embodiments, gas detector 100 may include a controller (shown in FIGS. 1B-C) operatively connected to one or more components of gas detector 100. In some embodiments, the controller may be configured to control one or more operations of gas detector 100. In some embodiments, controller may include one or more processors configured to execute instructions stored on a memory to perform one or more operations of gas detector 100 described herein. Other components known to one of ordinary skill in the art may be included in the controller or in gas detector 100 to gather, process, transmit, receive, acquire, and provide information used in conjunction with the disclosed embodiments.

In some embodiments, membrane 120 may be configured to form a sensing chamber 130 where gas sensor 140 is located. In some embodiments, membrane 120 may be a porous membrane, that acts as a barrier, and is configured to allow gas to flow into sensing chamber 130 and reach gas sensor 140 while filtering out other elements (e.g., liquids, dust, debris, etc.). The permeability (dependent on the number and size of the pores) of membrane 120 may depend on type of gas the gas detector 100 is configured to detect (e.g., different membranes with different permeabilities may be used in different gas detectors, depending on the gas to be detected). Membrane 120 may be any barrier which allows gas to flow to the sensing chamber and prevents other elements from reaching the gas sensor. In some embodiments, membrane 120 may be a hydrophobic membrane configured to repel and prevent liquids (e.g., water) from reaching sensing chamber 130. In some embodiments, membrane 120 may be flexible. For example, membrane 120 may contract, expand, flex, or change shape as a result of accumulated elements (e.g., liquids, dust, debris, dirt, etc.) or applied force on one or more walls of its surfaces. In some embodiments, membrane 120 may be consisting of porous sintered metal.

Photosensor 150 may be configured to generate output signals related to radiation through membrane 120. For example, radiation detection system 150 may be configured to measure the amount of radiation that passes through one or more walls of the membrane 120. This measurement may indicate a condition of membrane 120 (e.g., clean, dirty, clogged, damaged, missing, etc.). In some embodiments, the amount of radiation may also indicate a degree of blockage of one or more walls of the membrane. In some embodiments, the amount of radiation may indicate presence or absence of the membrane. In some embodiments, radiation detection system 150 may include a radiation source 152 and a radiation detector 154 (e.g., a photodetector). Radiation source 152 may be configured to generate radiation and detector 154 may be configured to detect the generated radiation after it passes through one or more walls of membrane 120. For example, in some embodiments, radiation source 152 may be configured to generate electromagnetic radiation having different wavelengths. The type of radiation (e.g., the wavelength of the radiation) may be determined based on the gas detector, the type of membrane, type of gas to be detected, environment of the gas detector, etc. For example, radiation source 152 may be configured to generate visible light, infrared light, ultraviolet light, or other wavelength electromagnetic radiation. In some embodiments, radiation detection system 150 (or source 152) may include an aperture or collimator for directing radiation to detector 154 and to limit the detection of light that has not traveled the intended path from the source.

Detector 154 (or controller 160) may be configured to determine the amount of radiation that passes through the one or more walls of membrane 120 (based on the detected radiation). For example, in some embodiments, detector 154 may be configured to detect one or more wavelengths generated by radiation source 152 after it passes through the membrane. The wavelength band may be selectively filtering the radiation at the source or at the detector(s). In some embodiments, the selection may further be to optimize for scatter by particles (e.g., sand, dirt, and/or other particles); or by selective absorption of light by contaminants (e.g., water, solvents, condensing gases oils, or other contaminants). In some embodiments, detector 154 may include control electronics for determining the amount of radiation detected by the detector 154. For example, detector 154 may be configured to modulate, demodulate, amplify, and/or select specific wavelengths from the radiation received. In some embodiments, controller 160 may provide the control electronics operations for the detector 154. Detectors may include, but are not limited to, pyrodetectors, bolometers, photoresistors, photoconductors, photocells, and/or photodiodes.

In some embodiments, the radiation source 152 and the radiation detector 154 may be placed on opposite sides of membrane 120. In the example shown in FIGS. 1A-C, radiation source 152 is placed inside sensing chamber 130, while detector 154 is placed outside the sensing chamber. However, this is not intended to be limiting. Other configurations of radiation detection system 150 may be used and are consistent with the present disclosure. For example, in some embodiments, radiation source 152 may be placed outside sensing chamber 130 and detector 154 may be placed inside the sensing chamber. Alternatively, in some embodiments, radiation source 152 and detector 154 may be placed on the same side of the membrane 120 (e.g., both inside, or both outside the sensing chamber). In these embodiments, a radiation reflector may be placed on the opposite side of the membrane to reflect the radiation that passes through the membrane back to the detector for radiation measurements. For example, radiation source 152 and detector 154 may both be placed inside the sensing chamber 130. A radiation reflector (e.g., reflective or light scattering surface, a mirror or other radiation non-absorbing element) may be placed outside sensing chamber 130. The radiation reflector may be configured to reflect the radiation that passes through the membrane back to detector 154 inside the chamber for radiation measurements. Alternatively, in some embodiments, radiation source 152 and detector 154 may both be placed outside the sensing chamber 130 and the radiation reflector may be placed inside sensing chamber 130. In some embodiments, radiation source 152 may be modulated and sensors or sensor signals may be demodulated to reduce effects of detected radiation from other sources.

The examples in FIGS. 1A-B show a radiation detection system 150 having a single radiation detector 154. However, this is for illustrative purposes only and is not intended to be limiting. In some embodiments, for example, radiation detection system 150 may include two detectors placed on either side of the membrane (outer surface and inner surface). In these cases, comparison of measurements from the detectors may be used to determine the condition of the membrane. FIG. 1C illustrates an example of radiation detection system 150 including a second radiation detector 156 placed on the same side of as the radiation source 152. Second detector 156 may be configured to detect radiation directly from radiation source 152 (i.e., without going through the membrane). In this example, radiation source 152 and second detector 156 are both inside sensing chamber 130, and detector 154 is outside the chamber. Alternatively, radiation source 152 and second detector 156 may be both outside sensing chamber 130, and detector 154 may be inside the chamber. In these embodiments, a difference in radiation measurements from detector 154 and the second detector 156 may be indicative of whether the membrane is blocked. For example, in some embodiments, membrane 120 may be determined to be clogged if the difference between the radiation measurements reaches a pre-determined value. In some embodiments, radiation detection system 150 may include one or more of a beamsplitter and/or additional filters between source 152 and the detectors 154 (and/or 156) to adjust the amount of light in the selected wavelength bands from the source falling on the detectors.

Controller 160 (shown in FIGS. 1B-C) may be configured to control one or more operations of gas detector 100. In some embodiments, controller 160 is operatively connected to membrane 120, radiation detection system 150, sensor 140, and/or other components of gas detector 100. In some embodiments, controller 160 (shown in FIG. 1B) may control operations of radiation detection system 150. For example, controller 160 may activate radiation detection system 150. In some embodiments, some, or all operations of control electronics of radiation detection system 150 may be performed by controller 160. In some embodiments, controller 160 may be configured to determine an amount of radiation transmitted through one or more walls of membrane 120 based on output signals from radiation detection system 150 (e.g., from detector 154). For example, controller 160 may determine the amount of radiation based on radiation detected by detector 154.

It is to be understood that the forms of the invention shown in the drawings and described herein are to be taken as examples of embodiments. Other types of the gas detector components may be used and are consistent with the present disclosure. For example, in some embodiments, the barrier may be the weather shield. In some embodiments, more than one radiation source may be used. In some embodiments, a plurality of sensors may be used to investigate the blockages from specific materials of interest (e.g., water, hydrocarbons, sand etc.).

In some embodiments, controller 160 may be configured to determine a radiation change through membrane 120 based on the determined amount of radiation. For example, controller 160 may be configured to determine the radiation change by comparing the determined amount of radiation with previous measurements (e.g., when membrane 120 was clean, when gas detector was first installed, or when membrane was serviced, etc.). In some embodiments, where radiation detection system 150 includes two detectors placed on either side of the membrane (e.g., inside or outside the sensing chamber), controller 160 may be configured to determine radiation change (or difference) by comparing radiation from the detector inside the sensing chamber with the detector outside the sensing chamber.

In some embodiments, controller 160 may be configured to determine a condition of membrane 120. For example, controller 160 may be configured to determine whether membrane 120 is clean, dirty, clogged, damaged, missing, etc. In some embodiments, controller 160 may be configured to determine a condition of membrane 120 based on the measured (or determined) amount of radiation transmitted through membrane 120. In some embodiments, controller 160 may determine presence of blockage (e.g., caused by debris, liquids, or dirt on the membrane) responsive to the amount of radiation reaching a radiation threshold. In some embodiments, the radiation threshold may be determined by the manufacturer, a user, or controller 160. In some embodiments, the radiation threshold may be determined based on one or more of the type of gas detector, type of membrane (e.g., porosity, radiation permeability, etc.), type of gas inside the chamber, membrane condition, and previous radiation measurements.

In some embodiments, controller 160 may be configured to determine the condition of membrane 120 based on radiation change. For example, in these embodiments, controller 160 may determine a first amount of radiation transmitted through the membrane (e.g., when membrane is clean). Controller 160 may subsequently determine the change in the amount of radiation (e.g., via subsequent one or more radiation measurements) and determine the condition of the membrane based on the radiation change. In some embodiments, controller 160 may determine that membrane 120 is clogged (or damaged or missing) responsive to the determined radiation change reaching a radiation change threshold. In some embodiments, the radiation change threshold may be determined based on one or more of the type of gas detector, type of membrane (e.g., porosity, radiation permeability, etc.), type of gas inside the chamber, membrane condition, and previous radiation measurements.

In some embodiments, controller 160 may be configured to determine the condition of membrane 120 based on the radiation change between the inside and the outside of the sensing chamber (e.g., in cases where the radiation detection system includes a detector inside the sensing chamber and a detector outside the sensing chamber). For example, in these embodiments, controller 160 may determine a second amount of radiation (e.g., directly from the radiation source without going through the membrane) and determine whether the membrane is blocked based on a difference between the determined radiation measurements. In some embodiments, controller 160 may determine that membrane 120 is clogged (or damaged or missing) responsive to the determined difference in the radiation measurements reaching a threshold value for the difference in radiation. In some embodiments, the threshold may be defined with respect to a simultaneous measurement on the second detector that detects radiation directly from the radiation source. In some embodiments, the radiation threshold value may be determined based on one or more of the type of gas detector, type of membrane (e.g., porosity, radiation permeability, etc.), type of gas inside the chamber, membrane condition, and previous radiation measurements.

In some embodiments, controller 160 may be configured to determine (or estimate) an amount of blockage of the membrane based on the determined membrane radiation (radiation change, or radiation difference). In some embodiments, controller 160 may be configured to determine (or estimate) a remaining operational life of the membrane based on the determined radiation, radiation change, or radiation ratio. For example, controller 160 may indicate whether or when the membrane should be cleaned or replaced based the determined radiation.

In some embodiments, controller 160 may be configured to automatically activate radiation detection system 150 (e.g., by activating the radiation source and the detector to measure radiation transmitted through membrane 120). The controller 160 may activate radiation detection system 150 periodically to check (or test) for blockage in the membrane. For example, the controller may check for blockage on pre-determined schedule, on demand (e.g., locally or remotely via a communication network), or based on previous test results. For example, if the radiation measurements or the amount of blockage determined during a previous test is outside of a defined range, the controller 160 may be configured to change testing schedule (e.g., may check for blockage before a pre-scheduled test). Similarly, if the radiation measurements or the amount of blockage determined during a previous test is within or below a defined range, the controller may skip a scheduled check for blockage.

In some embodiments, controller 160 may be configured to generate a feedback or alert including one or more of the radiation measurements, a condition of the membrane, determination of whether the membrane is blocked, the amount of blockage, or an estimation of remaining operational life of the membrane. In some embodiments, the feedback may be displayed on a display of the gas detector. In some embodiments, controller 160 may generate an alarm (e.g., audible or visual alarm) responsive to determining the condition of the membrane (e.g., lights, or alarm sounds). In some embodiments, different types of alarms may be used based on the condition of the membrane. For example, green light if the barrier is clean, yellow if it's beginning to clog, red light it's nearly or completely blocked, torn, or missing, etc. Similarly, different audible alarms (e.g., in volume, duration, intensity, etc.) may be based on the condition of the membrane. In some embodiments, the feedback/alert may be sent to a user device (e.g., via a communication network) which may allow users to remotely monitor operations of the gas detector (e.g., detecting the condition of the membrane). In some embodiments, controller 160 may be configured to communicate with a maintenance scheduling system to trigger a maintenance call based on the determined condition of the membrane. With this advance warning, the end-user may schedule maintenance to replace the membrane prior to failure and reduce costly down-time or gas detector failures due to blocked membranes.

Figure 2A:
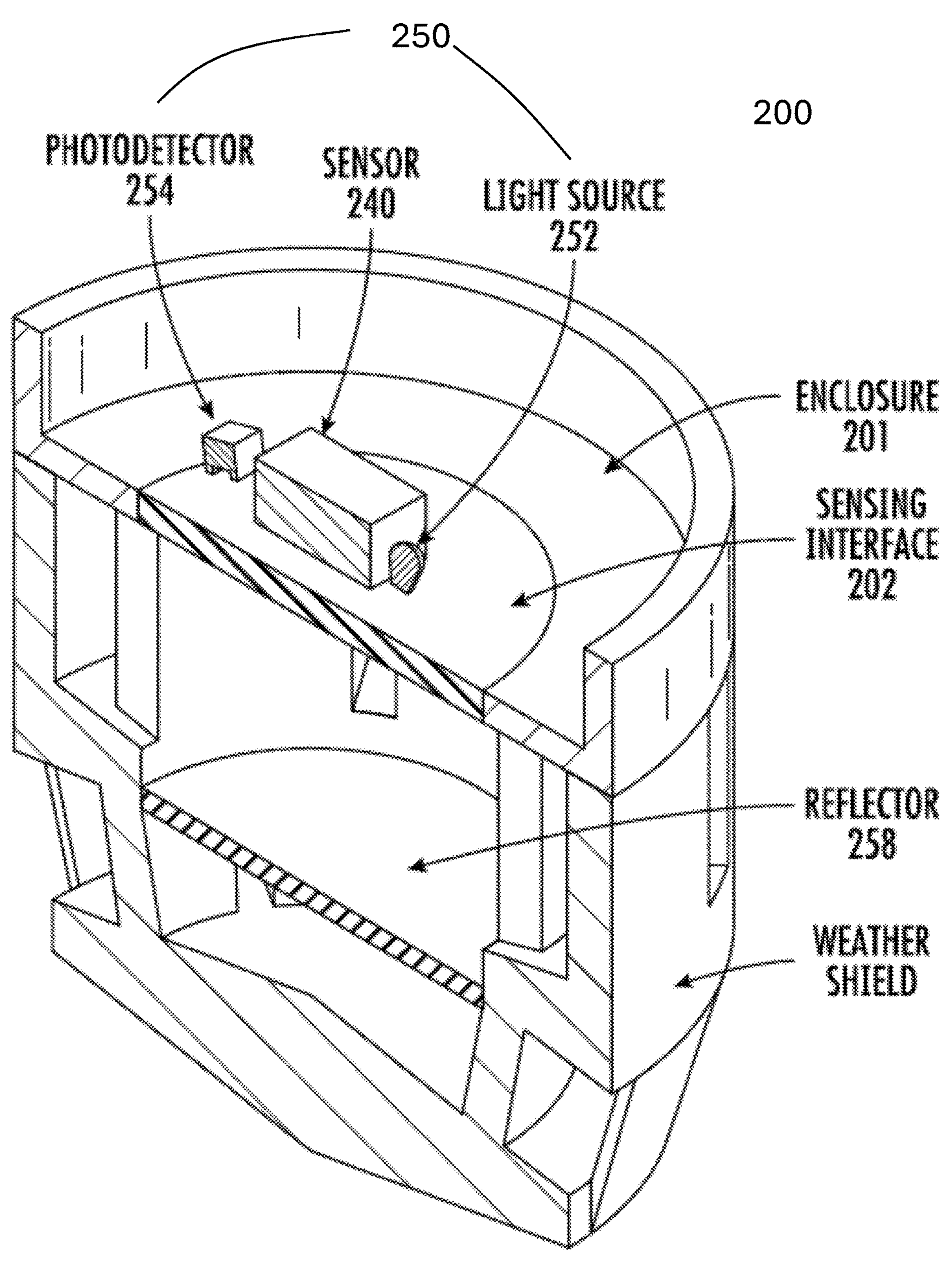
FIGS. 2A-B show perspective views of an example of a combustible gas detector, in accordance with one or more embodiments.
Figure 2B:
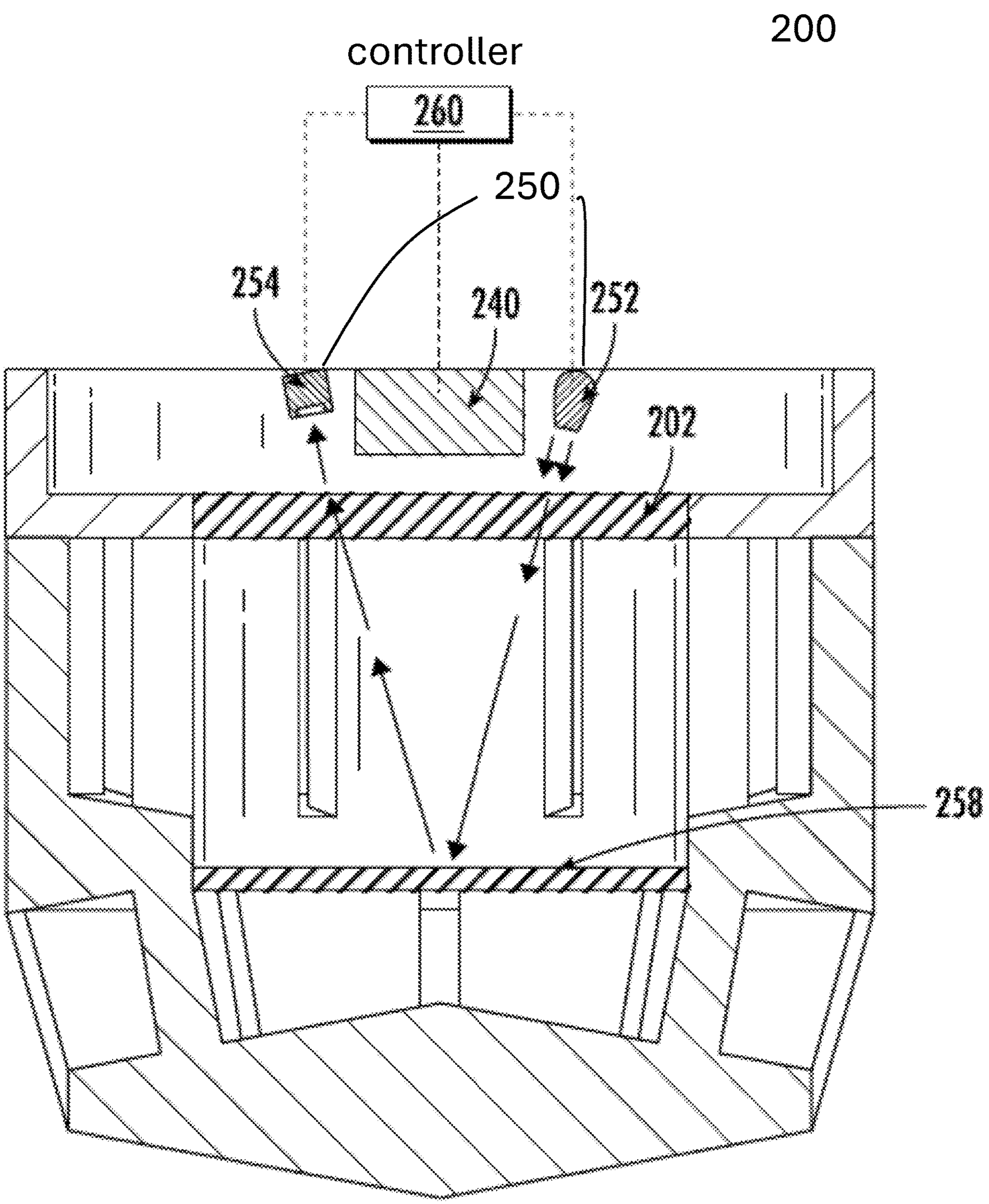

FIGS. 2A-B are perspective views of an example of a combustible gas detector 200, in accordance with one or more embodiments. In some embodiments, gas detector 200 may include a gas sensor 240 and a radiation detection system 250 (252, 254). In some embodiments, gas detector 200 may include a controller 260 (shown in FIG. 2B) operatively connected to one or more components of gas detector 200. In some embodiments, the controller 260 may be configured to control one or more operations of gas detector 200. In some embodiments, controller may include one or more processors configured to execute instructions stored on a memory to perform one or more operations of gas detector 200 described herein. Other components known to one of ordinary skill in the art may be included in the controller or in gas detector 200 to gather, process, transmit, receive, acquire, and provide information used in conjunction with the disclosed embodiments.

In some embodiments, gas sensor 240 may be configured to detect (or measure) gas within enclosure 201. In some embodiments, the enclosure 201 may be configured to house one or more components of gas detector 200. For example, gas sensor 240 may be housed in enclosure 201. In some embodiments, gas sensor 240 may be detachably connected to enclosure 201 to facilitate removal of gas sensor 240 (e.g., for maintenance, repair, malfunction, or if gas detector 200 is used to detect a different gas). In some embodiments, enclosure 201 may include a sensing interface 202 configured to act as a barrier which allows gas to flow into enclosure 201 and reach gas sensor 250-240 while filtering out other elements (e.g., liquids, dust, debris, etc.). In some embodiments, sensing interface 202 may include a porous material. For example, a porous membrane (e.g., hydrophobic membrane), a sinter, or other porous material.

Radiation detection system 250 may be configured to generate output signals related to radiation through sensing interface 202. In some embodiments, radiation detection system 250 may be similar to radiation detection system 150 described above. For example, radiation detection system 250 may be configured to measure the amount of radiation that passes through sensing interface 202. This measurement may indicate a condition of sensing interface 202 (e.g., clean, dirty, clogged, damaged, missing, etc.). In some embodiments, the amount of detected radiation at the radiation detection systems may also indicate a degree of blockage of sensing interface 202. In some embodiments, radiation detection system 250 may include a radiation source 252, a radiation detector 254, and a radiation reflector 258. In some embodiments, radiation reflector 258 may be a reflective or light scattering surface, a mirror, or other radiation partial absorbing or non-absorbing element. Radiation reflector 258 may be configured to reflect the radiation that passes through the sensing interface 202 back to detector 254.

In some embodiments, radiation source 252 and detector 254 may be placed inside enclosure 201. Radiation source 252 may be configured to generate radiation and detector 254 may be configured to detect the generated radiation after it passes through sensing interface 202. In some embodiments, gas detector 200 may include a radiation reflector 258 placed outside of enclosure 201. The radiation reflector 258 may be configured to reflect the radiation that passes through the sensing interface 202 back to detector 254 inside the enclosure 201 for radiation measurements. Alternatively, in some embodiments, radiation source 252 and detector 254 may both be placed outside the enclosure 201 and the radiation reflector 258 may be placed inside enclosure 201.

Controller 260 (shown in FIG. 2B) may be configured to control one or more operations of gas detector 200. In some embodiments, controller 260 is operatively connected to radiation detection system 250, gas sensor 240, and/or other components of gas detector 200. In some embodiments, controller 260 may control operations of radiation detection system 250. For example, controller 260 may activate radiation detection system 250. In some embodiments, some, or all operations of control electronics of radiation detection system 250 may be performed by controller 260. In some embodiments, controller 260 may be configured to determine an amount of radiation transmitted through sensor interface 202 based on output signals from radiation detection system 250 (e.g., from detector 254). For example, controller 260 may determine the amount of radiation based on radiation detected by detector 254.

In some embodiments, controller 260 may be configured to determine a radiation change through sensing interface 202 based on the determined amount of radiation (e.g., by comparing the determined amount of radiation with previous measurements). In some embodiments, controller 260 may be configured to determine a condition of sensing interface 202 (e.g., clean, dirty, clogged, damaged, missing, etc.) based on the measured amount of radiation transmitted through sensing interface 202. In some embodiments, controller 260 may determine presence of blockage (e.g., caused by debris, liquids, or dirt on the membrane) responsive to the amount of radiation reaching a radiation threshold. In some embodiments, the radiation threshold may be determined by the manufacturer, a user, or controller 260. In some embodiments, the radiation threshold may be determined based on one or more of the type of gas detector, type of sensing interface (e.g., type of membrane or type of sinter), ambient environment conditions, membrane condition, and previous radiation measurements.

In some embodiments, controller 260 may be configured to determine (or estimate) an amount of blockage of sensing interface 202 based on the determined radiation (or radiation change). In some embodiments, controller 260 may be configured to determine (or estimate) a remaining operational life of the membrane based on the determined radiation, or radiation change. For example, controller 260 may indicate whether or when the sensing interface should be cleaned or replaced based on the determined radiation.

In some embodiments, controller 260 may be configured to automatically activate radiation detection system 250 (e.g., by activating the radiation source and the detector to measure radiation transmitted through sensing interface 202). The controller 260 may activate radiation detection system 250 periodically to check (or test) for blockage in the sensing interface 202. For example, the controller may check for blockage on a pre-determined schedule, on demand (e.g., locally or remotely via a communication network), or based on previous test results. For example, if the radiation measurements or the amount of blockage determined during a previous test is outside of a defined range, the controller 260 may be configured to change a testing schedule (e.g., may check for blockage before a pre-scheduled test). Similarly, if the radiation measurements or the amount of blockage determined during a previous test is within or below a defined range, the controller may skip a scheduled check for blockage.

In some embodiments, controller 260 may be configured to generate a feedback or alert including one or more of the radiation measurements, a condition of the sensing interface, determination of whether the sensing interface is blocked, the amount of blockage, or an estimation of remaining operational life of the sensing interface. In some embodiments, the feedback may be displayed on a display of the gas detector. In some embodiments, controller 260 may generate an alarm responsive to determining the condition of the sensing interface. In some embodiments, the feedback/alert may be sent to a user device (e.g., via a communication network) which may allow users to remotely monitor operations of the gas detector (e.g., detecting the condition of the membrane). In some embodiments, controller 260 may be configured to communicate with a maintenance scheduling system to trigger a maintenance call based on the determined condition of the sensing interface.

Figure 2C:
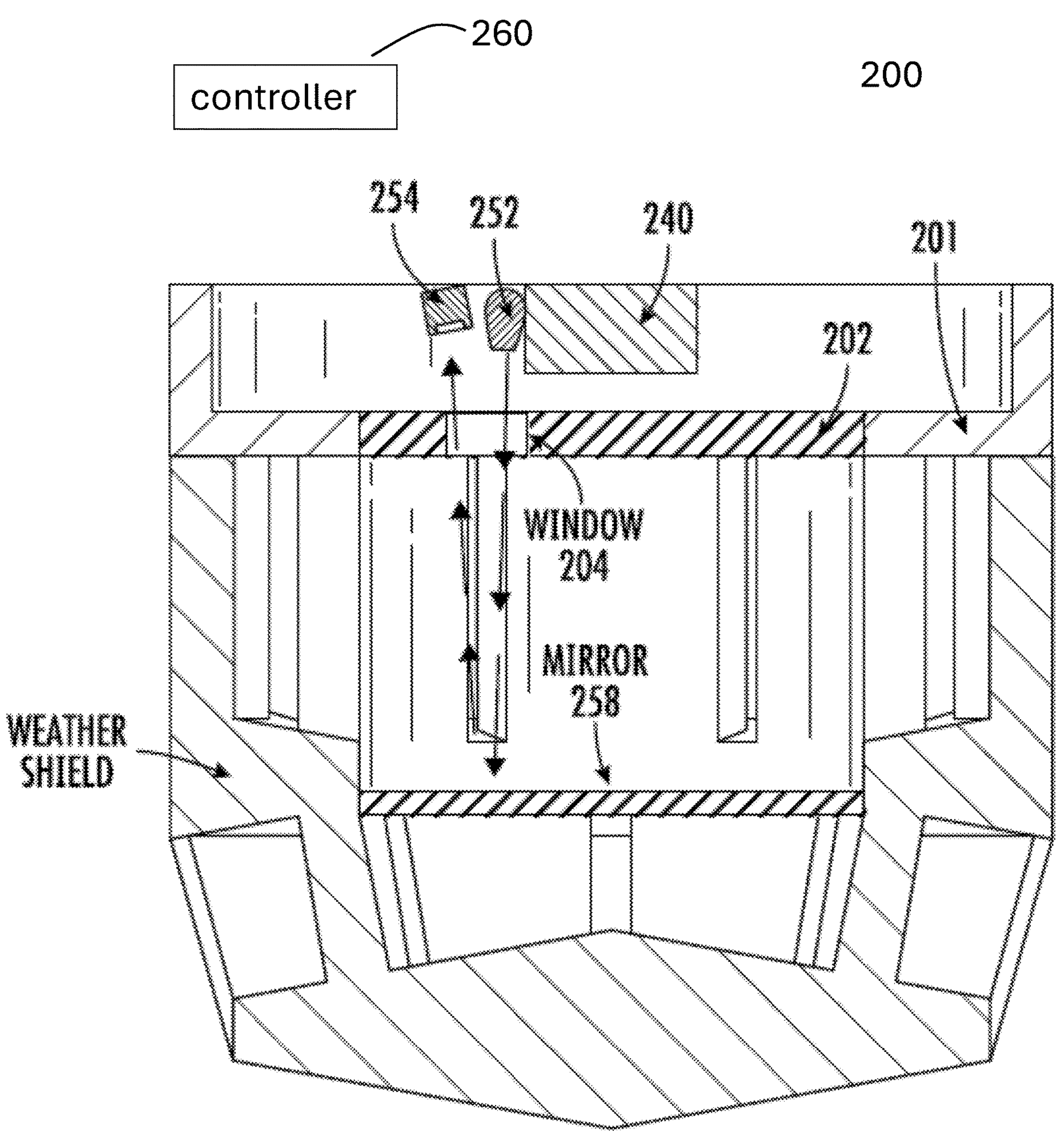
FIG. 2C shows a perspective view of an example of a combustible gas detector, in accordance with one or more embodiments.
Figure 2D:
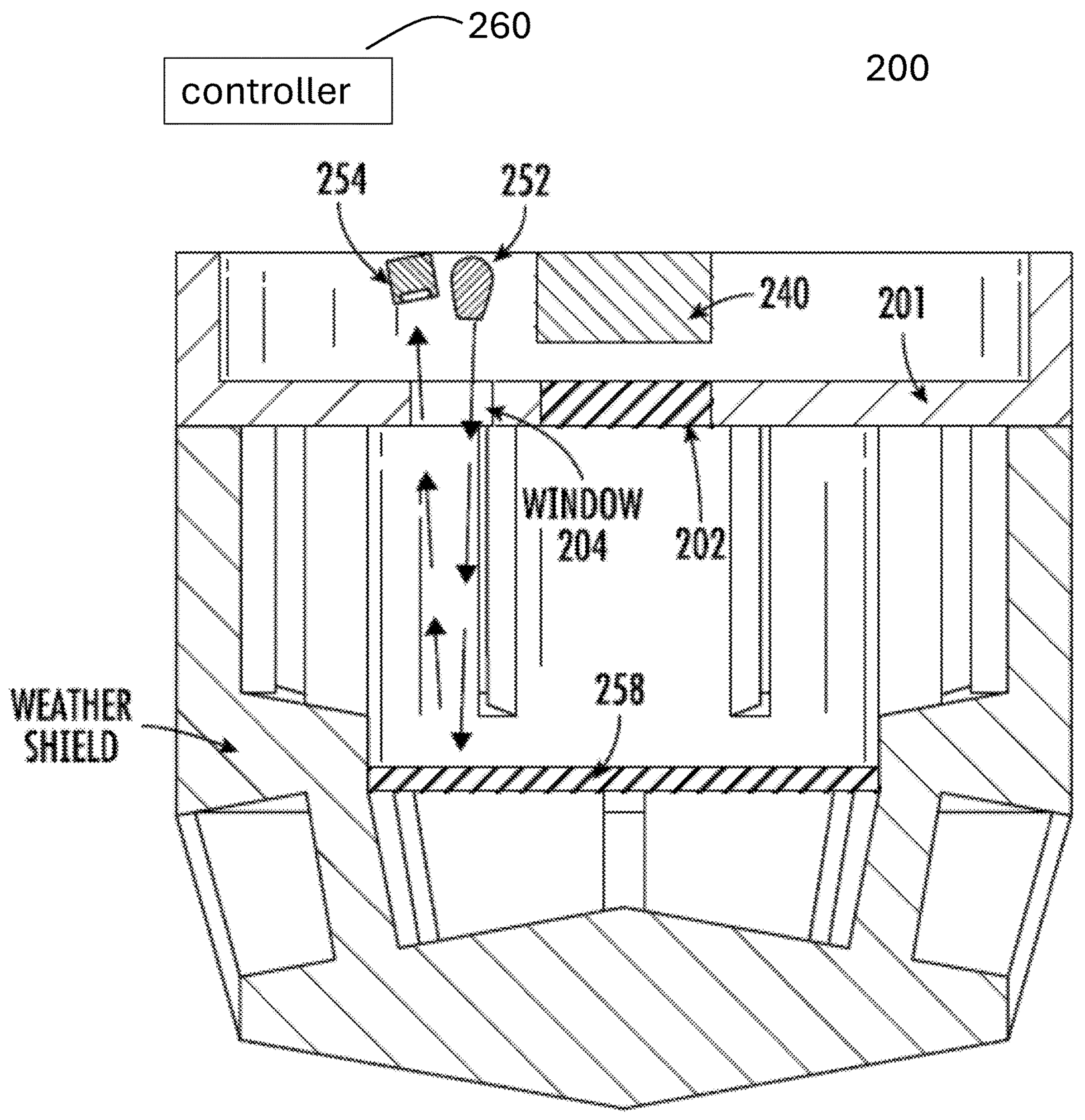
FIG. 2D shows a perspective view of an example of a combustible gas detector, in accordance with one or more embodiments.

FIG. 2C is a perspective view of an example of a combustible gas detector 200, in accordance with one or more embodiments. In some embodiments, sensing interface 202 may include a window 204. In some embodiments, the window may be located in the detector housing (as shown in FIG. 2D). In some embodiments, the condition of window 204 may be indicative of the condition of the barrier (e.g., sensing interface 202). In these embodiments, radiation reflector 258 may be configured to reflect the radiation that passes through window 204 back to detector 254. For example, controller 260 may be configured to determine a condition of sensing interface 202 (e.g., whether it is clean, dirty, clogged, damaged, missing, etc.) based on the measured amount of radiation transmitted through window 204. In some embodiments, controller 260 may determine the condition of sensing interface 202 responsive to the amount of radiation through window 204 reaching a radiation threshold. In some embodiments, the radiation threshold may be determined based on window 204 composition (e.g., glass, plastic, etc.). FIG. 2D is a perspective view of an example of a combustible gas detector 200, in accordance with one or more embodiments. FIG. 2D shows an example where window 204 is located in housing 201.

Figure 3:
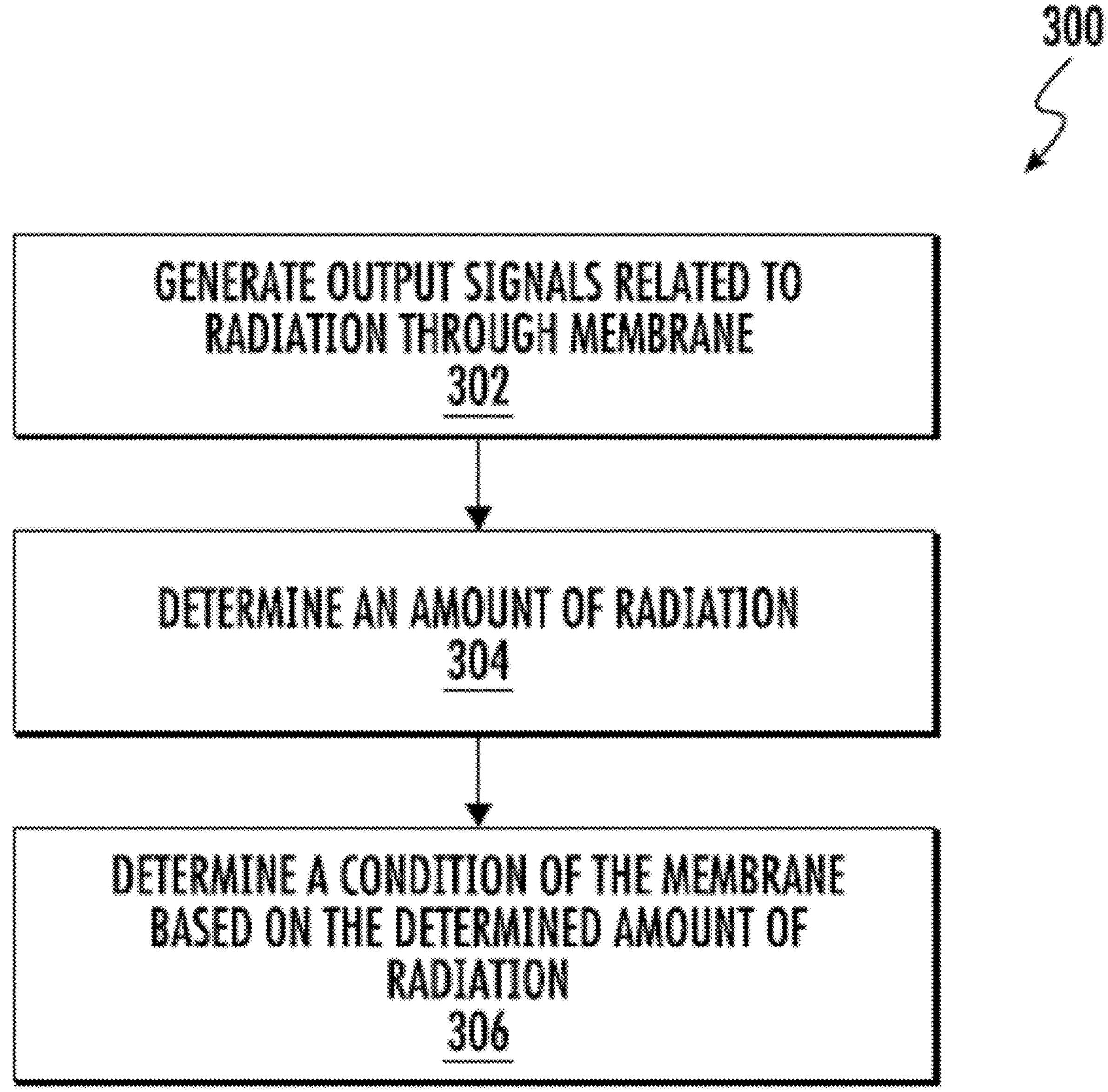
FIG. 3 shows a flow diagram illustrating an example of a method for detecting blockage in a gas detector, in accordance with one or more embodiments.

FIG. 3 shows a flow diagram illustrating an example of a method 300 for detecting membrane blockage in a gas detector, in accordance with one or more embodiments of the present disclosure. In some embodiments, the gas detector comprises a membrane defining a sensing chamber of the detector, and a radiation detection system (e.g., as described above).

At an operation 302 of method 300, one or more output signals related to radiation transmitted through the membrane may be generated. In some embodiments, operation 302 may be performed by a radiation detection system the same as or similar to radiation detection system 150 (shown in FIGS. 1A-C and described herein).

At an operation 304 of method 300, an amount of radiation transmitted through the membrane may be determined. In some embodiments, operation 304 may be performed by a controller the same as or similar to controller 160 (shown in FIGS. 1B-C and described herein).

At an operation 306 of method 300, a condition of the membrane may be determined based on the determined amount of radiation. In some embodiments, operation 306 may be performed by controller the same as or similar to controller 160 (shown in FIGS. 1B-C and described herein).

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word “may” is used in a permissive sense (i.e., meaning having the potential to), rather than the mandatory sense (i.e., meaning must). The words “include”, “including”, and “includes” and the like mean including, but not limited to. As used throughout this application, the singular forms “a,” “an,” and “the” include plural referents unless the content explicitly indicates otherwise. Thus, for example, reference to “an element” or “a element” includes a combination of two or more elements, notwithstanding use of other terms and phrases for one or more elements, such as “one or more.” The term “or” is, unless indicated otherwise, non-exclusive, i.e., encompassing both “and” and “or.” Terms describing conditional relationships, e.g., “in response to X, Y,” “upon X, Y,”, “if X, Y,” “when X, Y,” and the like, encompass causal relationships in which the antecedent is a necessary causal condition, the antecedent is a sufficient causal condition, or the antecedent is a contributory causal condition of the consequent, e.g., “state X occurs upon condition Y obtaining” is generic to “X occurs solely upon Y” and “X occurs upon Y and Z.” Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is “based on”

another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A gas detector comprising:

a barrier configured to define a sensing chamber of the gas detector;

a gas sensor located in an interior of the sensing chamber;

a radiation detection system, the radiation detection system comprising a radiation source and first detector, the radiation detection system configured for generating output signals related to radiation transmitted from the radiation source, through the barrier and to the first detector;

wherein the radiation source is located inside the sensing chamber and the first detector is located outside of the sensing chamber;

and a controller operatively connected to the radiation detection system, the controller configured to:

determine an amount of radiation transmitted through the barrier based on the output signals; and determine a condition of the barrier based on the determined amount of radiation, wherein the determined condition indicates whether the barrier is blocked.

2. The gas detector of claim 1, wherein presence of blockage in the barrier is determined responsive to the determined amount of transmitted radiation through the barrier being below a radiation threshold.

3. The gas detector of claim 2, wherein the radiation threshold is determined based on a radiation permeability of the barrier.

4. The gas detector of claim 2, wherein the controller is further configured to:

determine an amount of blockage of the barrier based on the determined amount of radiation.

5. The gas detector of claim 4, wherein determining the amount of blockage comprises determining a first amount of radiation transmitted through the barrier when the barrier is clean, determining a change between the determined amount of radiation and the first amount of radiation, and determining the amount of blockage based on the radiation change.

6. The gas detector of claim 1, wherein the controller is further configured to:

determine a remaining operational life of the barrier based on the determined amount of radiation.

7. The gas detector of claim 1, wherein the controller is configured to:

send an alert to a user, the alert indicating the condition of the barrier.

8. The gas detector of claim 1, further comprising a second detector, wherein the second detector is located inside the sensing chamber; and the controller is configured to:

determine a first amount of radiation transmitted through the barrier and received by the first detector;

determine a second amount of radiation received by the second detector without going through the barrier; and determine the condition of the barrier based on a comparison of the first amount of radiation and the second amount of radiation.

9. The gas detector of claim 1, wherein the radiation source is a light source and the detector is a light detector.

10. The gas detector of claim 1, wherein the barrier is a hydrophobic membrane configured to allow gas to flow while blocking liquids and debris.

11. The gas detector of claim 1, wherein the barrier is a membrane having a permeability selected in response to a type of gas the gas detector is configured to detect.

12. The gas detector of claim 11, wherein the permeability of the barrier is dependent on a number and a size of pores in the membrane.

* * * * *